US010162103B2

(12) United States Patent
Trutna et al.

(10) Patent No.: US 10,162,103 B2
(45) Date of Patent: Dec. 25, 2018

(54) FLEXIBLE BACKLIGHT ILLUMINATION CARRIER

(71) Applicant: Microsoft Technology Licensing, LLC, Redmond, WA (US)

(72) Inventors: Tristan Thomas Trutna, Seattle, WA (US); Edward Francis Burress, Westlinn, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 516 days.

(21) Appl. No.: 14/676,808

(22) Filed: Apr. 1, 2015

(65) Prior Publication Data

US 2016/0291244 A1 Oct. 6, 2016

(51) Int. Cl.
  *G02B 6/00* (2006.01)
  *F21V 8/00* (2006.01)
  *G02F 1/1335* (2006.01)
  *G02B 6/42* (2006.01)

(52) U.S. Cl.
  CPC .......... *G02B 6/0091* (2013.01); *G02B 6/002* (2013.01); *G02B 6/0016* (2013.01); *G02B 6/0068* (2013.01); *G02B 6/0083* (2013.01); *G02F 1/133615* (2013.01); *G02B 6/4267* (2013.01); *G02F 2203/21* (2013.01)

(58) Field of Classification Search
  CPC .......................... G02B 6/0091; G02B 6/0021
  USPC ................. 362/600–634; 385/90–92
  See application file for complete search history.

(56) References Cited

U.S. PATENT DOCUMENTS

| 7,364,345 B2 | 4/2008 | Fang |
| 7,588,351 B2 | 9/2009 | Meyer |
| 8,197,082 B2 | 6/2012 | Cho et al. |
| 8,690,412 B2 | 4/2014 | Franklin et al. |
| 2002/0080599 A1 | 6/2002 | Toyoda et al. |
| 2006/0006777 A1 | 1/2006 | Lo et al. |
| 2008/0043171 A1 | 2/2008 | Takahashi et al. |
| 2009/0237592 A1* | 9/2009 | Mizutani ............ G02B 6/0021 349/62 |
| 2010/0149802 A1* | 6/2010 | Chang ................. G02B 6/002 362/235 |

(Continued)

FOREIGN PATENT DOCUMENTS

| JP | 10-334718 | 12/1998 |
| WO | 2013048161 A2 | 4/2013 |

OTHER PUBLICATIONS

"International Search Report & Written Opinion Issued in PCT Application No. PCT/US2016/023336", dated Jun. 16, 2016, 13 Pages.

(Continued)

*Primary Examiner* — Sean Gramling
*Assistant Examiner* — Gerald J Sufleta, II
(74) *Attorney, Agent, or Firm* — Ray Quinney & Nebeker; Paul N. Taylor; Qudus Olaniran

(57) ABSTRACT

A display includes a light guide plate, a plurality of light sources disposed along an edge of the light guide plate, and a flexible carrier to which the plurality of light sources are secured. The flexible carrier includes a plurality of flexures, each flexure of the plurality of flexures disposed between a respective pair of adjacent light sources of the plurality of light sources to allow a spacing between the pair of adjacent light sources to change.

20 Claims, 3 Drawing Sheets

(56) References Cited

U.S. PATENT DOCUMENTS

| | | | |
|---|---|---|---|
| 2013/0016309 A1* | 1/2013 | Wang | G02B 6/0078 |
| | | | 349/62 |
| 2013/0242600 A1* | 9/2013 | Franklin | G02B 6/0073 |
| | | | 362/602 |
| 2013/0301295 A1 | 11/2013 | Iwasaki | |
| 2013/0343085 A1 | 12/2013 | Qian et al. | |
| 2014/0104538 A1 | 4/2014 | Park et al. | |
| 2015/0146110 A1* | 5/2015 | Matsukawa | H04N 5/64 |
| | | | 348/790 |

OTHER PUBLICATIONS

Shannon Mahanna, "Welcome to the World of LED Light Displays", The Dolan Dispatch, Oct. 9, 2013, 3 pages, http://blog.dolanprinting.com/bid/341285/Welcome-to-the-World-of-LED-Light-Displays.

* cited by examiner

FLEXIBLE BACKLIGHT ILLUMINATION CARRIER

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
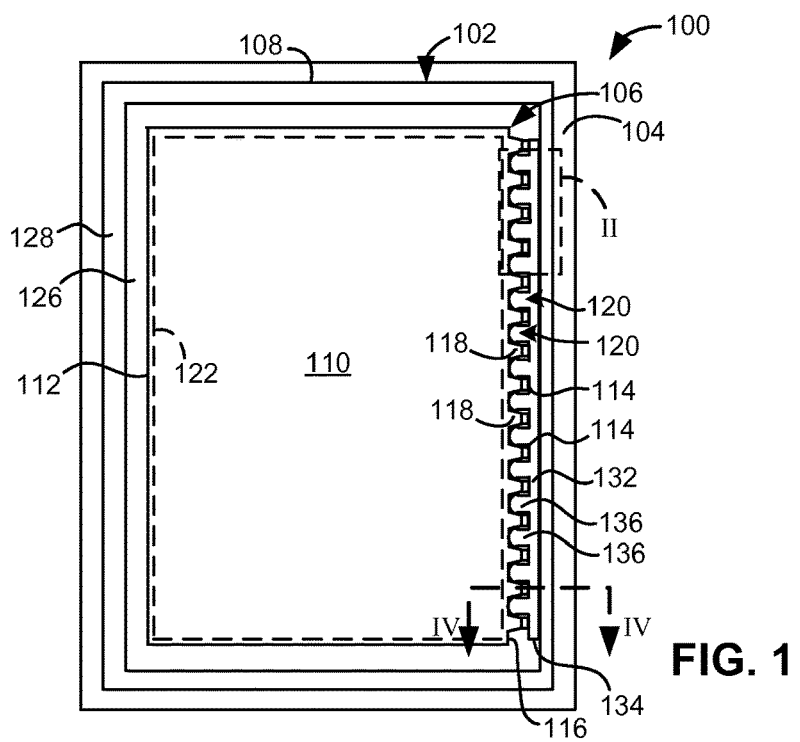
FIG. 1 is a schematic, plan view of a display module of an electronic device having a flexible backlight illumination carrier in accordance with one example.

The embodiments of the disclosed devices and systems may assume various forms. Specific embodiments are illustrated in the drawing (and are hereafter described), with the understanding that the disclosure is intended to be illustrative, and is not intended to limit the invention to the specific embodiments described and illustrated herein.

DETAILED DESCRIPTION

A display module of an electronic device includes a number of components directed to providing illumination. For example, the components include thin films or other layers of a backlight unit. The layers are arranged in a stack and supported by a frame. One of the layers of the backlight unit is a light guide plate, which distributes light generated by the backlight unit. The light guide plate may thus cover the entire lateral extent of the display module.

Thermal expansion of the light guide plate occurs over all three dimensions of the light guide plate. Thermal expansion thus occurs over the entire lateral extent of the display. Such expansion may result in significant displacement of the light guide plate relative to other components of the display module, including, for instance, light sources disposed along an edge of the light guide plate. For example, a displacement of 1 mm occurs in a display having a length of 200 mm and thermal expansion of 0.5%. Such expansion may occur in connection with the range of operating temperatures for the electronic device, which are often about 40 degrees C. (e.g., about 20 degrees C. to about 60 degrees C.) or more (e.g., with operating temperatures up to and exceeding 80 degrees C.). Moreover, the displacement increases with display size.

The displacement may exceed one or more alignment tolerances for the display module. For example, the displacement may exceed the alignment tolerance for the light sources. If the light sources are displaced beyond a particular threshold, then light leaks, and/or distortion and/or other abnormalities may be perceived by the user of the display module. Thus, it is advantageous to maintain alignment between the light guide plate and the lights sources located, for example, along the edge of the light guide plate over a range of temperatures in which the light guide plate may expand or contract.

The display modules are configured to address and/or compensate for the thermal expansion of the light guide plate. Light sources of the display module are secured to a flexible carrier that includes a number of flexures. Each flexure is disposed between a respective pair of the light sources to allow the spacing between the adjacent light sources to change. In some cases, the flexures are configured as springs, such as planar springs. When the light guide plate expands or contracts due to operating and/or storage conditions, the flexures are capable of likewise spreading or contracting, thereby allowing the spacing to change. The light sources and the light guide plate may thus share a common reference that expands and contracts in lockstep over the range of operating and/or storage temperatures.

The flexible carrier may be configured to engage the light guide plate. The engagement of the flexible carrier and the light guide plate may thus lead to the expansion and contraction of the flexible carrier. For example, the flexible carrier may include a number of projections that engage a number of notches or other features of the light guide plate. The engagement may be facilitated by a number of springs and/or other elements that bias (or pre-load) the flexible carrier toward (e.g., against) the light guide plate.

With the flexible carrier, the light sources of the backlight unit may remain aligned with a set of optical input terminals disposed along an edge of the light guide plate. The light sources are not displaced relative to the optical input terminals as the thermal expansion and contraction occurs. The relative positioning of the light sources is maintained without securing the light sources to the light guide plate.

Maintaining the alignment of the light sources and input terminals may be useful in connection with backlight units in which the illumination is customized or modified during operation. For example, the illumination may be collimated or steered to direct light toward a single user through pupil tracking and/or other techniques. The electronic device may thus be more power efficient, as the amount of wasted backlight illumination is lowered or minimized. The collimation, steering, and/or other customization of the backlight illumination may involve tight alignment of the light sources to positions along the edge of the light guide plate. The thermal expansion compensation of the display modules may maintain such alignment despite a wide operating temperature range (e.g., about 40 degrees C.) of the electronic device.

The flexible backlight illumination carrier is well suited for use with a wide variety of displays and electronic devices. For instance, although described in connection with tablet or other mobile electronic devices having touchscreens, the flexible backlight illumination carrier and other aspects of the devices may be used in connection with a wide variety of electronic devices, including those not having a touch-sensitive display. The size and form factor of the electronic device may vary considerably. Devices may range from wearable or handheld devices to televisions or other wall-mounted displays or other large-scale devices. Although some aspects relate to displays having edge-mounted light sources of a backlight unit, the composition and other characteristics of the backlight unit and display module may also vary. For example, the backlight unit and/or the display module may include light sources in addition to edge-mounted sources. Thus, various types of displays may be used, including, for example, reflective displays in which front lights are used. Other aspects of the electronic devices may vary as well, including, for instance, a wide variety of non-display features.

The flexible backlight illumination carrier may be useful in connection with display modules in which the alignment or positioning of the display module components impacts the operation of the display module. However, the configuration and construction of the backlight unit and display module may vary considerably. The flexible backlight illumination carrier is thus not limited to circumstances in which display module alignment or positioning is of concern. The term "thermal expansion" may refer to either expansion or contraction.

FIG. 1 shows an electronic device 100 with a display module 102 configured for thermal expansion compensation. In this example, the electronic device 100 is configured as a tablet device or other handheld device in which the display module 102 displays images across a front face of the electronic device 100. The display arrangement of the electronic device 100 may vary considerably from the tablet-shaped form factor shown. For example, the display module 102 may be curved, e.g., to provide a band-shaped form of, for instance, a wristband or a head-mounted display.

The display module 102 is disposed within a shell 104. The shell 104 may define one or more outer surfaces of the device 100. For example, the shell 104 may be shaped as a case configured to define a back or rear cover of the electronic device 100, as well as lateral sides or edges of the electronic device 100. A front face of the electronic device 100 may be defined by a transparent cover, which is not shown to more easily depict the display module 102. Any housing or other enclosure may be used for the shell 104. Additional or alternative enclosures may be used. For example, the display module 102 (and its constituent components) may be disposed within an outer frame.

The shell 104 and/or other enclosure may be configured to allow thermal expansion of components of the display module 102, including, for instance, display frame and light guide plate components. The manner in which the shell 104 or other enclosure allows the thermal expansion may vary. In some cases, the material composition of the shell 104 or other enclosure allows the shell 104 or other enclosure to expand at a rate at least as high as the rate at which the display module components expand. Alternatively or additionally, the shell 104 or other enclosure may be sized to allow the display module components to expand. For example, the shell 104 or other enclosure may be sized and spaced from the display module component(s) (e.g., the display frame) to allow such thermal expansion. One example of such spacing is described and shown in connection with FIG. 3, in which spacers are disposed between the shell 104 and the display frame.

In the example of FIG. 1, various internal components of the electronic device 100, such as a battery and an electronics module, are disposed between the display module 102 and the shell 104. The arrangement of the internal components relative to the display module 102 may vary from the example shown. For example, the display module 102 may not extend across an entire front face of the electronic device 100 in some cases.

The display module 102 includes a backlight unit 106. A number of units, panels, or components of the display module 102 are not shown in order to better depict the backlight unit 106. For instance, the display module 102 may include a liquid crystal (LC) panel and a touch sensor unit, which are not shown. Each of the LC panel and the touch sensor unit may be composite structures that include, for instance, a number of constituent layers, films, or other structures. For example, the LCD panel may include an LC layer disposed between two glass layers, e.g., a color filter layer and an active matrix layer.

The configuration of the LC panel and the touch sensor unit may vary considerably. For example, the LC panel may be configured as an in-plane switched (IPS) display or a plane-to-line switched (PLS) display, but other types of display technologies may be used, such as vertical alignment (VA) displays. Different types of LC display technologies may be used, including, for instance, super-twisted nematic and other twisted nematic LC displays. The touch sensor unit may include a touch sensor panel pre-applied to the outer surface of the color filter layer of the LCD panel in an in-cell touch sensing arrangement, but other sensor arrangements may be used, such as an on-cell touch sensing arrangement. The extent to which the units of the display module 102 are integrated may also vary. For example, a glass layer or polarizer layer of the LC panel may form a transparent cover or outer layer.

The display module 102 includes a display frame 108 disposed within the shell 104. The frame 108 may be used to support the backlight unit 106. The frame 108 may also be used to support other units or panels of the display module 102, such as the LC panel and the touch sensor unit.

The frame 108 may be adjacent to an inner face of the shell 104. The frame 108 may or may not be contiguous or in contact with the shell 106. In some cases, the frame 108 may be slightly spaced inwardly from the shell 104 to allow for thermal expansion of the frame 108. A number of compressible spacers (FIG. 3) may be used. Alternatively or additionally, the shell 104 may expand or otherwise allow for thermal expansion of the frame 108, thereby allowing the frame 108 to be in contact with the shell 104 as shown in the schematic view of FIG. 1. For example, the shell 104 may expand at roughly the same rate as the frame 108 or at a greater rate.

The backlight unit 106 includes a light guide plate 110 disposed within the frame 108. An outer periphery 112 of the light guide plate 110 may define or establish a viewable area of the display module 102. The light guide plate 110 may sit on, and/or be disposed within the frame 108. The frame 108 may thus act as a support structure for the light guide plate 110 and/or other components of the display module 102.

The light guide plate 110 is configured to guide the light from a number of light sources 114 disposed along one or more edges of the light guide plate 110. In this example, the light sources 114 are arranged along a single edge 116. Light emitted by the light sources 114 enters the light guide plate 110 at the edge 116. The light is then guided by the light guide plate 110 (e.g., through total internal reflection) to support propagation across the viewing area until extraction and redirection toward the viewer. Each light source 114 may be supported by the frame 108.

Each light source 114 may be or include a light emitting diode (LED) device. Additional or alternative emission devices may be used. For example, semiconductor lasers may be used. The number, location, configuration, and other characteristics of the light sources 114 may vary from the example shown.

The light guide plate 110 may be configured to redirect the light toward the viewer. In some cases, light extraction may be achieved by varying the index of refraction. In other cases, the light guide plate 110 may have a number of structures or other features integrally formed therein to extract the light in a direction toward the viewer. The features may support both redirection and diffusion of the illumination, or solely redirection. In some cases, the light guide plate 110 has a number of lines etched within one or both of the front and rear faces. Each line may be a laser-etched or otherwise formed groove (e.g., a V-shaped groove). The lines may be arranged in a grid or other pattern. Alternatively or additionally, the light guide plate 110 may include a matrix of dots printed with diffusive ink on one or both of the front and rear faces of the light guide plate 110. The dots scatter the light propagating through the light guide plate 110. Alternatively or additionally, the light guide plate 110 includes a number of embedded particles or particulates configured to redirect the light. The quantity, depth, spacing, and/or other characteristics of these redirecting features may vary across the lateral extent of the light guide plate 110 to provide uniform illumination and/or other characteristics of the illumination.

The light guide plate 110 may include a set of optical input terminals 118 along the edge 116. Each light source 114 is aligned with a respective one of the optical input terminals 118. In the example of FIG. 1, each optical input terminal 118 abuts one of the light sources 114. The alignment may allow the light emitted by the light source 114 to enter the light guide plate 110 in a controlled or specific manner. The optical input terminals 118 may be configured differently to provide different illumination effects or scenarios. For example, illumination via one subset of the optical input terminals 118 may provide collimated or otherwise concentrated light, while illumination via another subset of the optical input terminals 118 may provide non-collimated or otherwise non-concentrated light. In some cases, the different illumination effects are provided by switching off one subset and switching on another subset. For example, the light sources 114 may alternate between the sets. A variety of other illumination effects may be provided. Examples include three-dimensional simulation and light steering toward different viewers and/or eyes.

The edge 116 of the light guide plate 110 may be notched to define the optical input terminals 118. The edge 116 may include a number of notches 120 to define the optical input terminals 118. In the example of FIG. 1, a pair of adjacent notches 120 along the edge 116 defines a respective one of the optical input terminals 118. The shape of the notches 120 defines the sidewalls of the optical input terminals 118. The sidewalls may be tapered, curved, or otherwise shaped to establish an optical function of the optical input terminal 118. For example, the optical input terminal 118 may be configured to act as a concentrator and/or a collimator. In other cases, the optical input terminal 118 may be configured to steer the light to provide, for instance, stereoscopic illumination.

The frame 108 may be disposed along the outer periphery 112 of the light guide plate 110. In this example, and as better shown in FIG. 3, the frame 108 has an inner boundary 122 to define a central opening. In other cases, the frame 108 may be plate-shaped and, thus, extend across an entire lateral extent of the light guide plate 110.

The frame 108 may have a tiered configuration that provides one or more shelves or tiers to support components of the backlight unit 106 or display module 102. In the example of FIG. 1, the frame 108 has a lower shelf 126 and an upper shelf 128. Additional, fewer, or alternative shelves or tiers may be provided. Each of the shelves 126, 128 is defined by one or more steps or walls. In this example, a sidewall or step 130 separates the lower shelf 126 from the upper shelf 128. The light guide plate 110 rests upon the lower shelf 126. The light sources 114 may indirectly or directly rest upon the lower shelf 126. These elements of the exemplary tiered configuration of the frame 108 are also shown in the cross-sectional view of FIG. 4.

The light guide plate 110 undergoes thermal expansion and contraction as the operating temperature varies. In the plan view of FIG. 1, the lateral expansion includes linear expansion in the lateral directions within the plane of the drawing sheet. The length of the light guide plate 110 along the edge 116 may thus increase and decrease.

The material of which the light guide plate 110 is composed is determinative of the rate of expansion. The rate may be expressed via a coefficient of thermal expansion of the material. For example, the light guide plate 110 may be composed of, or otherwise include, a plastic material, such as acrylic (polymethylmethacrylate or PMMA) or polycarbonate. The linear coefficient of thermal expansion of the light guide plate 110 may be about $75 \times 10^{-6}$ per Kelvin ($K^{-1}$) in acrylic examples and about $65 \times 10^{-6}$ $K^{-1}$ in polycarbonate examples. Other materials may be used for the light guide plate 110, including, for instance, other plastic materials (e.g., cyclic olefin polymers and cyclic olefin copolymers), as well as silicone materials ($2050-300 \times 10^{-6}$ $K^{-1}$). Other clear materials capable of acting as a light guide may be used, including, for instance, glass materials, and blended or layered clear polymers.

The display module 102 includes a flexible carrier 132 to which the light sources 114 are secured. The flexibility of the carrier 132 may address the thermal expansion of the light guide plate 110 along the edge 116. As described below, the carrier 132 includes springs or other flexures that spread or contract as the light guide plate 110 expands or contracts as the operating or storage temperature changes.

The carrier 132 is supported by the frame 108. In the example of FIG. 1, the carrier 132 rests upon the lower shelf 126. An outer edge of the carrier 132 may be disposed along the sidewall or step 130 of the frame 108. The carrier 132 may bear against the sidewall 130 to maintain engagement with the light guide plate 110. The lower shelf 126 and, more generally, the frame 108 may act as a chassis that allows the flexible carrier 132 to expand and contract (e.g., via sliding) with the light guide plate 110.

The carrier 132 may be strip-shaped. In this example, the carrier 132 includes a strip 134. Each light source 114 may be secured to an inner edge of the strip 134. For example, the light sources 114 may be soldered or adhesively secured to the strip 134. The light sources 114 may be carried by the flexible carrier 132 in other ways. For example, the light sources 114 may be mounted on the strip 134.

The carrier 132 may engage the light guide plate 110 such that the carrier 132 expands and contracts in lockstep with the light guide plate 110. The carrier 132 includes a number of projections 136. Each projection 136 engages a respective one of the notches 120. In this example, the projections 136 extend inwardly from the remainder of the strip 134. The projections 136 may be disposed in the plane of the strip 134. For example, the strip 134 and the projections 136 may be integrally formed. The projections 136 may thus also be strip-shaped.

The flexibility of the carrier 132 may be established by a number of flexures disposed along the length of the carrier 132. One or more flexures may be provided between each adjacent pair of light sources 114. The spacing between the light sources 114 may thus change with thermal expansion of the light guide plate 110. In the example of FIG. 1, one or more flexures may be located at a respective one of the projections 136. Each flexure may be or include one or more springs (e.g. planar springs), but the configuration of the flexures may vary. For example, the flexures may include or involve a service loop, as described in connection with the example of FIG. 5.

Figure 2:
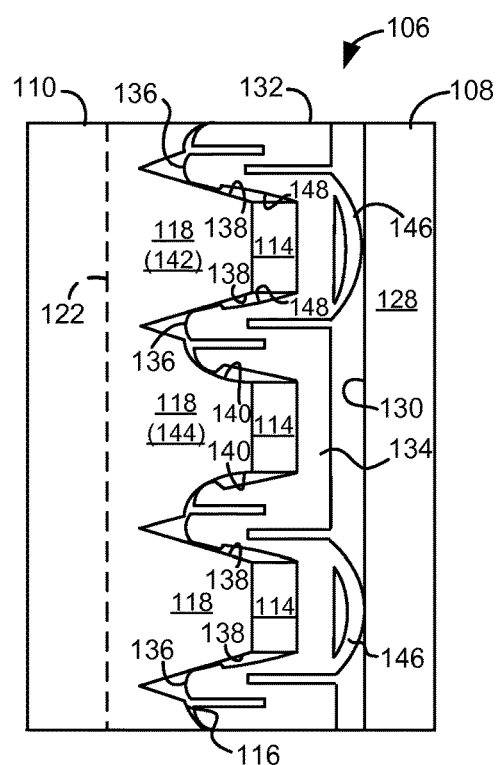
FIG. 2 is a schematic, partial, plan view of a backlight assembly of the display module of FIG. 1 having a flexible backlight illumination carrier and a notched light guide plate in accordance with one example.
Figure 3:
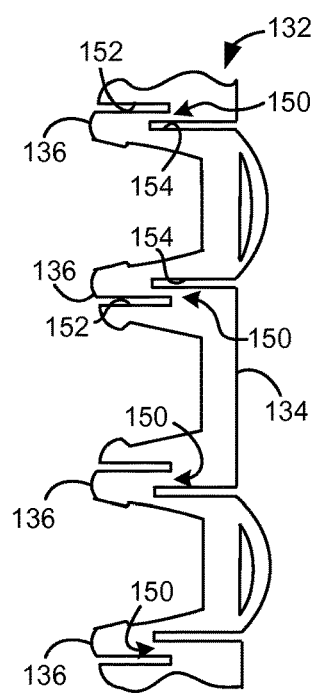
FIG. 3 is a schematic, partial, plan view of the flexible backlight illumination carrier of FIG. 2.

The carrier 132 and the projections 136 thereof are shown in simplified form in FIG. 1. More detailed views of an exemplary carrier, and the flexures thereof, are shown in FIGS. 2 and 3.

In some cases, the carrier 132 provides electrical connectivity for the light sources 114. For example, the carrier 132 may be configured as a circuit board to provide electrical connectivity to the light sources 114.

The strip 134 and projections 136 of the carrier 132 may be composed of polyimide and/or other flexible materials. In some cases, printed circuit board (PCB) materials, such as FR-4 fiberglass, may be used. In cases in which the carrier 132 acts as a structural guide and an electrical connector, a number of conductive traces (e.g., copper) may be deposited on one or both sides of the carrier 132. Other conductive arrangements may be used. For example, the electrical connections may be provided by a flexible circuit strip separate from the carrier 132. In such cases, the electrical structures may be flexible so as to not impede the movement of the structural component of the carrier 132. The structural and electrical functions of the carrier 132 may thus be integrated to varying extents.

The various components of the electronic device 100 shown in FIG. 1 may not be shown to scale for ease in illustration. The relative sizes of the components may thus differ from the example shown. The spacing between respective components may also differ from the example shown.

Other characteristics of the light guide plate 110 may vary from the example shown in FIG. 1. For instance, the light guide plate 110 (and thus the display module 102) may be flat or curved. The light guide plate 110 may be flexible or rigid. The transparency of the light guide plate 110 may vary as well.

FIG. 2 shows the backlight unit 106 in greater detail to depict one example of the manner in which the light guide plate 110 and the carrier 132 engage one another along the edge 116. The light guide plate 110 sits upon the frame 108. In this example, the light guide plate 110 and the carrier 132 are supported by the shelf 126 (FIGS. 1 and 4) of the frame 108. To that end, the light guide plate 110, and each optical input terminal 118 thereof, extends beyond the inner boundary 122 of the frame 108 to rest upon the lower shelf 126. The shelf 126 extends under the light guide 110 and the carrier 132 from the sidewall 130 defining the step between the shelves 126, 128.

In this example, the carrier 132 is disposed in a nested arrangement with the light guide plate 110 along the edge 116. The projections 136 of the carrier 132 may mate or engage with the notches 120 of the light guide plate 110. In this example, each projection 136 is in contact with respective sidewalls 138, 140 of one of the optical input terminals 118 defined by the notches 120 (FIG. 1).

Each light source 114 is disposed between a respective pair of adjacent projections 136. Each optical input terminal 118 may be aligned with, and abut, a respective one of the light sources 114. In this example, the light sources 114 may thus be disposed along elongate sections of the strip 134.

The sidewalls 138, 140 may be tapered and in contact with the adjacent projections 136 of the flexible carrier 132. The tapering or other shaping may vary to define different optical input terminals 118. In this example, the optical input terminals 118 include a non-parabolic reflector input terminal 142 with straight sidewalls 138 and a parabolic reflector input terminal 144 with curved sidewalls 140. The sidewalls 138, 140 may be shaped to control an extent to which light emitted from the respective light source 114 laterally spreads within the light guide plate 110. The shape of the sidewalls may vary considerably from the example shown.

The tapering of the sidewalls 138, 140 may also promote the alignment of the light sources 114. In this example, the tapering of the sidewalls 138, 140 establishes two points of contact between the light guide plate 110 and each projection 136 of the carrier 132. The two points of contact may properly position the carrier 132 and, thus, the light sources 114, laterally along the edge 116.

Figure 4:
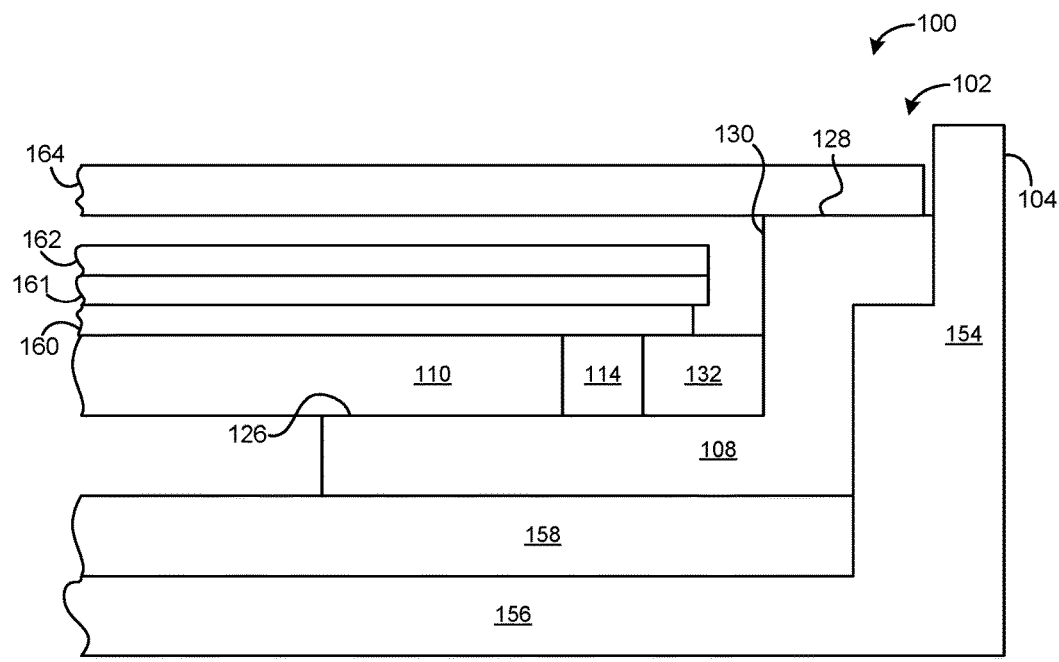
FIG. 4 is a schematic, cross-sectional view of the display module of FIG. 1 taken along lines IV-IV in FIG. 1 to depict the flexible backlight illumination carrier, the notched light guide plate, and other components of the display module in accordance with one example.

The carrier 132 may include additional features to support and maintain the positioning of the light sources 114. In this example, the carrier 132 includes a number of springs 146 that engage the sidewall 130 extending upward from the shelf 126 (FIGS. 1 and 4). The springs 146 extend outward in the opposite direction of the projections 136 to contact the sidewall 130. In this example, each spring 146 is configured as a leaf spring, but the configuration may vary. For example, other deformable elements may be used to apply a load between the chassis provided by the frame 108 and the light guide plate 110 to keep the light sources 114 seated against the light input terminals 118 of the light guide plate 110. The springs 146 engage the sidewall 130 to bias the flexible carrier 132 and the plurality of light sources 114 toward the light guide plate 110. In this example, the springs 146 are positioned along the strip 134 at every other light source 114. Additional, fewer, or alternative springs may be provided. For example, a spring may be provided for each light source 114.

The projections 136 may also facilitate the positioning of the light sources 114 during, for instance, device assembly. In this example, the adjacent projections 136 on either side of the light source 114 include tapered sides 148 that slope inward until being spaced apart by the lateral width of the light source 114. The tapered sides 148 may thus define a socket for the light source 114. The socket may be used to guide the light sources 114 into position during assembly. Each light source 114 is eventually disposed and secured between the adjacent projections 136.

FIG. 3 shows the carrier 132 alone to depict one example of a flexure arrangement used to establish the flexibility of the carrier 132. In this example, the carrier 132 includes a respective flexure 150 at each projection 136. Each flexure 150 may be disposed between a respective pair of adjacent light sources 114 (FIG. 2) to allow the spacing between the pair of adjacent light sources 114 to change. When the light guide plate 110 (FIG. 1) expands or contracts under operating and/or storage conditions, each flexure 150 likewise spreads or contracts, thereby locking the light sources 114 (FIG. 1) in position relative to the edge features of the light guide plate 110.

In the example of FIG. 3, each flexure 150 is configured as a planar spring. The flexure 150 may bend within the plane of the carrier 132. The planar spring of each flexure 150 may be provided by one or more slots in the strip 134. The slots may allow the carrier 132 to expand and contract without departing from the plane of the strip 134. In this example, each flexure 150 includes a pair of slots 152, 154 in the projection portion of the strip 134. One of the slots 152 extends inward from the end of the projection 134, while the other slot 154 extends inward from the other side of the strip 134. Relying on the slots 152, 154 to define the planar spring of each flexure 150 may be useful because the projection portion of the strip 134 may be otherwise shaped to engage and fit around the edge features of the light guide plate 110

(FIG. 1). The location, number, width, and other characteristics of the slots 152, 154 may vary from the example shown.

FIG. 4 is a partial, cross-sectional view of the electronic device 100 to depict the manner in which the frame 108, the light guide plate 110, the carrier 132, and a number of other components of the display module 102 are disposed within the enclosure provided by the shell 104. In this example, the shell 104 is shaped as a bucket, tray, or other container in which the frame 108, the light guide plate 110, and other internal device components are disposed. In this example, the shell 104 includes sidewalls 154 that extend upward from a back cover 156. The sidewalls 154 may be spaced from the frame 108 to allow for thermal expansion. For example, springs or other spacers (not shown) may be disposed between the frame 108 and the shell 104. The back cover 156 may also be spaced from the frame 108 by spacers and/or other internal device components (e.g., a battery) schematically depicted at 158.

FIG. 4 also depicts the manner in which the frame 108 supports the light guide plate 110, the carrier 132, and other components of the display module 102. In this example, the light guide plate 110 and the light sources 114 are supported by the lower shelf 126 of the frame 108. The light guide plate 110 extends across the lower shelf 126 to abut one of the light sources 114. The light source 114 is disposed along the carrier 132, which, in turn, is disposed at the sidewall 130 separating the lower shelf 126 and the upper shelf 128. In other cases, the light source 114 may be mounted on a top side of the carrier 132. The portion of the carrier 132 shown is the elongate section of the strip 134 between the projections 136 (FIGS. 2 and 3). The thickness of the carrier 132 and/or other components shown in FIG. 4 may be augmented for ease in illustration.

FIG. 4 also depicts the manner in which the frame 108 supports a number of optical layers or films stacked upon the light guide plate 110. For instance, the optical layers may include a number of light management films, examples of which are indicated at 160-162. The light management films 160-162 may provide various optical functions, such as diffusion. The optical layers may also include a polarizer or other layer of the LC panel. In this example, one or more layers of the LC panel is schematically depicted at 164. The LC panel may be supported by the upper shelf 128 as shown.

Figure 5:
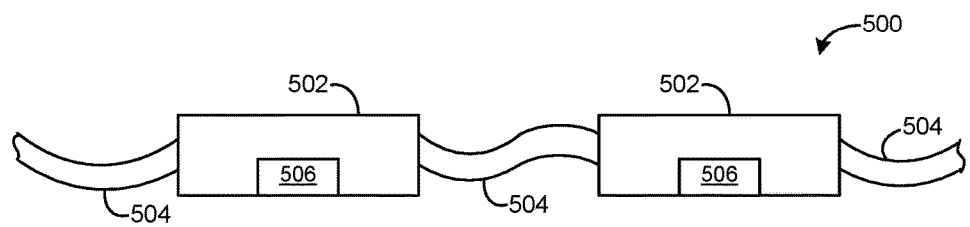
FIG. 5 is a schematic, partial, plan view of a flexible backlight illumination carrier in accordance with one example.

FIG. 5 depicts another example of a flexible carrier 500 to allow the light source spacing to change with thermal expansion of a light guide plate. In this example, the carrier 500 includes a number of rigid printed circuit board (PCB) sections 502 and a number of flexible circuit strip sections 504. Each rigid PCB section 502 has a respective light source 506 secured thereto. In this example, the light source 506 is mounted or otherwise disposed on the rigid PCB section 502.

Each flexible circuit strip section 504 is disposed between a respective pair of adjacent rigid PCB sections 502. The flexible circuit strip sections 504 may be configured with a certain amount of slack, or extra length, to allow for the thermal expansion. For example, each flexible circuit strip section 504 may include a service loop. The flexible circuit strip sections 504 may be bent within and/or outside of the plane of the rigid PCB sections 502.

Although not shown in FIG. 5, the flexible carrier 500 may include a number of features configured to engage the light guide plate for alignment therewith. For example, the features may extend laterally from the rigid PCB sections 502. Various types and/or shapes of projections or other features may be used. For example, the flexible carrier 500 may include indentations or other features to receive projections (e.g., non-light terminal projections) extending from the light guide plate.

Figure 6:
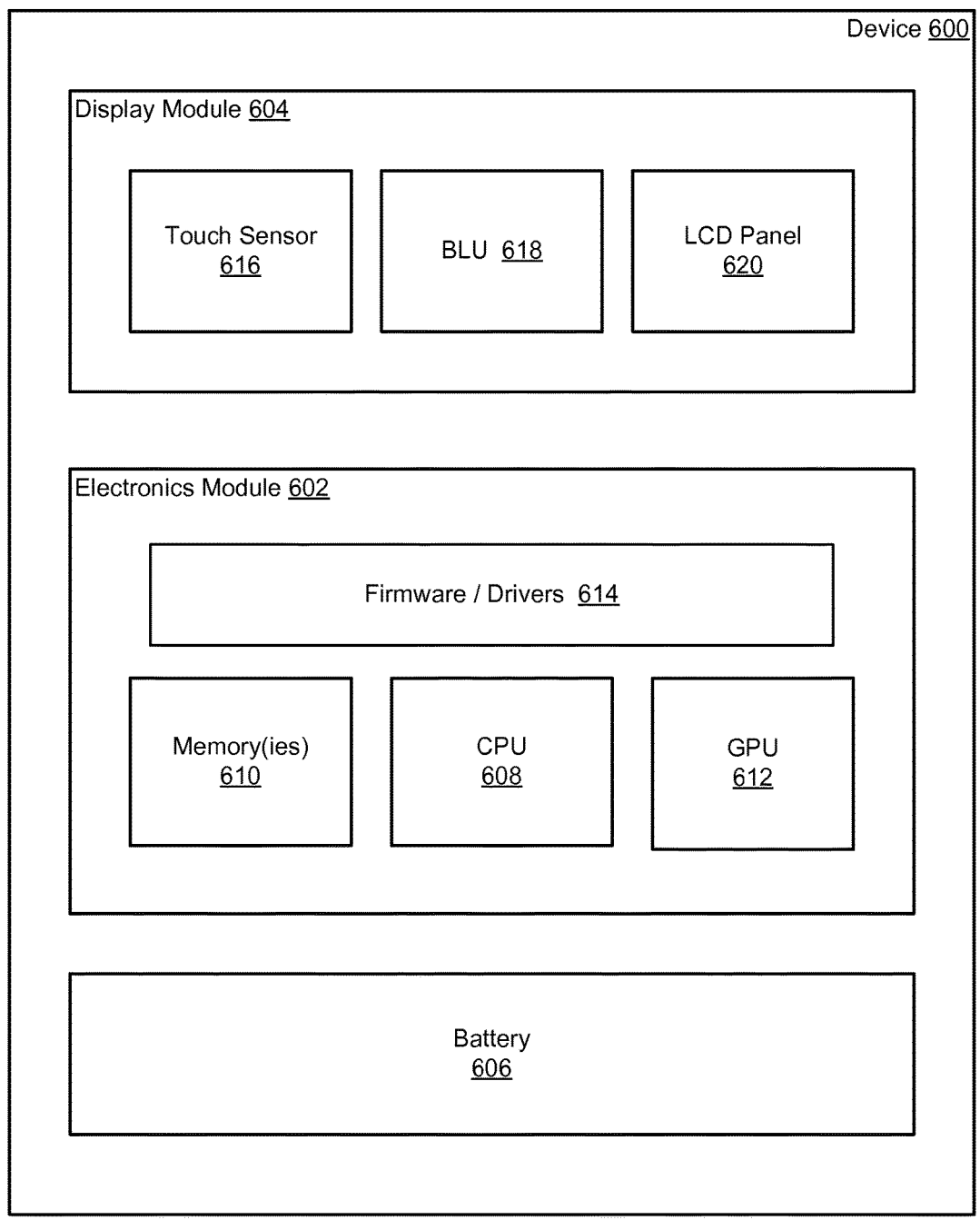
FIG. 6 is a block diagram of an electronic device having a display module in which a flexible backlight illumination carrier may be provided in accordance with one example.

FIG. 6 shows an exemplary electronic device 600 with an electronics module 602, a display module 604 (or subsystem), and a battery 606 that may include the thermal expansion compensated backlight illumination techniques described above. The display module 604 may be integrated with the electronics module 602 and/or other components of the electronic device 600 to a varying extent. For instance, the electronics module 602 and/or the display module 604 may include a graphics subsystem of the electronic device 600. Any number of display modules or systems may be included. In this example, the device 600 includes a processor 608 and one or more memories 610 separate from the display module 604. The processor 608 and the memories 610 may be directed to executing one or more applications implemented by the device 600. The display module 604 generates a user interface for an operating environment (e.g., an application environment) supported by the processor 608 and the memories 610. The processor 608 may be a general-purpose processor, such as a central processing unit (CPU), or any other processor or processing unit. Any number of such processors or processing units may be included.

In the example of FIG. 6, the electronics module 602 includes a graphics processing unit (GPU) 612 and firmware and/or drivers 614. The GPU 612 may be dedicated to graphics- or display-related functionality and/or provide general processing functionality. Some of the components of the electronics module 602 may be integrated. For example, the processor 608, the one or more of the memories 610, the GPU 612, and/or the firmware 614 may be integrated as a system-on-a-chip (SoC) or application-specific integrated circuit (ASIC). The electronics module 602 may include additional, fewer, or alternative components. For example, the electronics module 602 may not include a dedicated graphics processor, and instead rely on the CPU 608 or other general-purpose processor to support the graphics-related functionality of the electronic device 600. The electronics module 602 may include additional memory (or memories) to support display-related processing.

In the example of FIG. 6, the display module 604 includes a touch sensor unit 616, a backlight unit (BLU) 618, and an LCD panel or unit 620. Additional, fewer, or alternative components may be provided. For example, in some cases, the display module 604 does not include the touch sensor unit 616.

The device 600 may be configured as one of a wide variety of computing devices, including, but not limited to, handheld or wearable computing devices, such as tablets and watches, communication devices such as phones, laptop or other mobile computers, and personal computers (PCs). The device 600 may also be configured as a display device, such as a television or computer monitor.

In one aspect, a display includes a light guide plate, a plurality of light sources disposed along an edge of the light guide plate, and a flexible carrier to which the plurality of light sources are secured. The flexible carrier includes a plurality of flexures. Each flexure of the plurality of flexures is disposed between a respective pair of adjacent light sources of the plurality of light sources to allow a spacing between the pair of adjacent light sources to change.

In another aspect, a display includes a light guide plate having an edge. The edge includes a plurality of notches to define a set of optical input terminals along the edge. The display further includes a plurality of light sources disposed along the edge of the light guide plate. Each light source is aligned with a respective optical input terminal of the set of optical input terminals. The display further includes a flexible carrier to which the plurality of light sources are secured. The flexible carrier engages the plurality of notches along the edge of the light guide plate. The flexible carrier includes a plurality of flexures. Each flexure of the plurality of flexures is disposed between a respective pair of adjacent light sources of the plurality of light sources to allow a spacing between the pair of adjacent light sources to change.

In yet another aspect, an electronic device includes a shell, a frame disposed within the shell, and a light guide plate disposed within the frame. The light guide plate includes an edge. The edge includes a plurality of notches to define a set of optical input terminals along the edge. The electronic device further includes a plurality of light sources disposed along the edge of the light guide plate. Each light source is aligned with a respective optical input terminal of the set of optical input terminals. The electronic device further includes a flexible carrier to which the plurality of light sources are secured. The flexible carrier engages the plurality of notches along the edge of the light guide plate. The flexible carrier includes a plurality of flexures. Each flexure of the plurality of flexures is disposed between a respective pair of adjacent light sources of the plurality of light sources to allow a spacing between the pair of adjacent light sources to change In connection with any one of the aforementioned aspects, the electronic device may alternatively or additionally include any combination of one or more of the following aspects or features. The edge of the light guide includes a plurality of notches along the edge of the light guide plate, and the flexible carrier includes a plurality of projections, each projection engaging a respective notch of the plurality of notches. Each light source of the plurality of light sources is disposed between a respective pair of adjacent projections of the plurality of projections, and the plurality of notches define a set of optical input terminals, each optical input terminal being aligned with, and abutting, a respective light source of the plurality of light sources. Each optical input terminal of the set of optical input terminals includes sidewalls shaped to control an extent to which light emitted from the respective light source laterally spreads within the light guide plate. The sidewalls are tapered and in contact with the adjacent projections of the flexible carrier. The flexible carrier is configured as a circuit board to provide electrical connectivity to the plurality of light sources. The display further includes a frame, the frame including a shelf on which the light guide plate and the flexible carrier are disposed, such that the flexible carrier slides along the shelf with thermal expansion of the light guide plate. The frame includes a wall extending upward from the shelf, and the flexible carrier includes a plurality of springs that engage the wall to bias the flexible carrier and the plurality of light sources toward the light guide plate. The flexible carrier includes a strip, and each flexure of the plurality of flexures includes a slot in the strip such that the flexure expands and contracts within a plane of the strip. The flexible carrier includes a plurality of rigid printed circuit board (PCB) sections, each rigid PCB section having a respective light source of the plurality of light sources is disposed thereon, and a plurality of flexible circuit strip sections, each flexible circuit strip section being disposed between a respective pair of adjacent rigid PCB sections of the plurality of rigid PCB sections.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A display comprising:
   a light guide plate having an edge shaped to define a set of optical input terminals;
   a plurality of light sources disposed along the edge of the light guide plate, each light source aligned with a respective optical input terminal of the set of optical input terminals; and
   a flexible carrier to which the plurality of light sources are secured;
   wherein the flexible carrier comprises a plurality of flexures, each flexure of the plurality of flexures disposed between a respective pair of adjacent light sources of the plurality of light sources to allow a spacing between the pair of adjacent light sources to change so that the plurality of light sources remain aligned with the set of optical input terminals upon thermal expansion of the light guide plate.

2. The display of claim 1, wherein:
   the edge of the light guide comprises a plurality of notches along the edge of the light guide plate; and
   the flexible carrier comprises a plurality of projections, each projection engaging a respective notch of the plurality of notches.

3. The display of claim 2, wherein:
   each light source of the plurality of light sources is disposed between a respective pair of adjacent projections of the plurality of projections; and
   the plurality of notches define a set of optical input terminals, each optical input terminal aligned with, and abutting, a respective light source of the plurality of light sources.

4. The display of claim 3, wherein each optical input terminal of the set of optical input terminals comprises sidewalls shaped to control an extent to which light emitted from the respective light source laterally spreads within the light guide plate.

5. The display of claim 4, wherein the sidewalls are tapered and in contact with the adjacent projections of the flexible carrier.

6. The display of claim 1, wherein the flexible carrier is configured as a circuit board to provide electrical connectivity to the plurality of light sources.

7. The display of claim 1, further comprising a frame, the frame comprising a shelf on which the light guide plate and the flexible carrier are disposed, such that the flexible carrier slides along the shelf with thermal expansion of the light guide plate.

8. The display of claim 7, wherein:
   the frame comprises a wall extending upward from the shelf; and
   the flexible carrier comprises a plurality of springs that engage the wall to bias the flexible carrier and the plurality of light sources toward the light guide plate.

9. The display of claim 1, wherein:
   the flexible carrier comprises a strip; and each flexure of the plurality of flexures comprises a slot in the strip such that the flexure expands and contracts within a plane of the strip.

10. The display of claim 1, wherein the flexible carrier comprises:
a plurality of rigid printed circuit board (PCB) sections, each rigid PCB section having a respective light source of the plurality of light sources disposed thereon; and
a plurality of flexible circuit strip sections, each flexible circuit strip section disposed between a respective pair of adjacent rigid PCB sections of the plurality of rigid PCB sections.

11. A display comprising:
a light guide plate comprising an edge, the edge being shaped to comprise a plurality of notches to define a set of optical input terminals along the edge;
a plurality of light sources disposed along the edge of the light guide plate, each light source aligned with a respective optical input terminal of the set of optical input terminals; and
a flexible carrier to which the plurality of light sources are secured, the flexible carrier engaging the plurality of notches along the edge of the light guide plate;
wherein the flexible carrier comprises a plurality of flexures, each flexure of the plurality of flexures disposed between a respective pair of adjacent light sources of the plurality of light sources to allow a spacing between the pair of adjacent light sources to change so that the plurality of light sources remain aligned with the set of optical input terminals.

12. The display of claim 11, wherein the flexible carrier comprises a plurality of projections, each projection engaging a respective notch of the plurality of notches.

13. The display of claim 12, wherein:
each light source of the plurality of light sources is disposed between a respective pair of adjacent projections of the plurality of projections; and
the plurality of notches define the set of optical input terminals, each optical input terminal aligned with, and abutting, a respective light source of the plurality of light sources.

14. The display of claim 13, wherein each optical input terminal of the set of optical input terminals comprises sidewalls shaped to control an extent to which light emitted from the respective light source laterally spreads within the light guide plate.

15. The display of claim 11, wherein the flexible carrier is configured as a circuit board to provide electrical connectivity to the plurality of light sources.

16. The display of claim 11, further comprising a frame, the frame comprising a shelf on which the light guide plate and the flexible carrier are disposed, such that the flexible carrier slides along the shelf with thermal expansion of the light guide plate, wherein:
the frame comprises a wall extending upward from the shelf; and
the flexible carrier comprises a plurality of springs that engage the wall to bias the flexible carrier and the plurality of light sources toward the light guide plate.

17. An electronic device comprising:
a shell;
a frame disposed within the shell;
a light guide plate disposed within the frame, the light guide plate comprising an edge, the edge being shaped to comprise a plurality of notches to define a set of optical input terminals along the edge; and
a plurality of light sources disposed along the edge of the light guide plate, each light source aligned with a respective optical input terminal of the set of optical input terminals; and
a flexible carrier to which the plurality of light sources are secured, the flexible carrier engaging the plurality of notches along the edge of the light guide plate;
wherein the flexible carrier comprises a plurality of flexures, each flexure of the plurality of flexures disposed between a respective pair of adjacent light sources of the plurality of light sources to allow a spacing between the pair of adjacent light sources to change so that the plurality of light sources remain aligned with the set of optical input terminals.

18. The electronic device of claim 17, wherein:
the flexible carrier comprises a plurality of projections, each projection engaging a respective notch of the plurality of notches;
each light source of the plurality of light sources is disposed between a respective pair of adjacent projections of the plurality of projections; and
the plurality of notches define a set of optical input terminals, each optical input terminal aligned with, and abutting, a respective light source of the plurality of light sources.

19. The electronic device of claim 17, wherein the flexible carrier is configured as a circuit board to provide electrical connectivity to the plurality of light sources.

20. The electronic device of claim 17, wherein:
the frame comprises a shelf on which the light guide plate and the flexible carrier are disposed, such that the flexible carrier slides along the shelf with thermal expansion of the light guide plate;
the frame comprises a wall extending upward from the shelf; and
the flexible carrier comprises a plurality of springs that engage the wall to bias the flexible carrier and the plurality of light sources toward the light guide plate.

* * * * *